BLOCK SENSING ASSEMBLY

Original Filed June 17, 1957 2 Sheets-Sheet 1

INVENTOR
RONALD H. ARTHUR
BY Thomas S. Ross
Albert W. Scribner
ATTORNEYS

BLOCK SENSING ASSEMBLY

Original Filed June 17, 1957

2 Sheets-Sheet 2

INVENTOR
RONALD H. ARTHUR
BY Thomas S. Ross
Albert W. Scribner
ATTORNEYS

United States Patent Office 3,001,699

Patented Sept. 26, 1961

3,001,699

BLOCK SENSING ASSEMBLY

Ronald H. Arthur, West Hartford, Conn., assignor to Royal McBee Corporation, Port Chester, N.Y., a corporation of New York Continuation of application Ser. No. 665,986, June 17, 1957. This application Apr. 20, 1960, Ser. No. 23,454

6 Claims. (Cl. 235—61.11)

This invention relates to a block sensing assembly for a perforated record reading device and more particularly relates to a modular electromechanical block sensing unit having a novel compact construction and arrangement of the component parts thereof.

This application is a continuation of my copending case Serial Number 665,986, filed June 17, 1957, now abandonded, for Block Sensing Assembly.

In certain business machine systems perforated records, such as punched tapes, cards and the like are used to control one or more of the various component units of the system. The perforated record is provided with a series of holes which are positioned in accordance with a particular code pattern so as to collectively define a group of characters. The perforated record is fed into a reading device which initiates a plurality of successive groups of output signals that correspond to the group distribution of the holes in the record. During this type of operation, many conventional electromechanical record reading devices sequentially sense each successive transverse row of punched holes, however, it is apparent that if several transverse rows of punched holes can be sensed simultaneously the speed of reading the record may be greatly increased. Various attempts have been made to provide electromechanical reading devices which sense more than one of said rows at a time, however, such attempts have for the most part proven impractical because of the lack of a structural arrangement which is small enough to fit into the limited space required to accommodate the closely spaced holes in the punched record. That only a small space is available in which to position such a block sensing apparatus may be readily seen from the fact that the holes in the record are usually .072 inch in diameter and are spaced a distance of one tenth of an inch between centers. Here, for example, if six rows of an eight "level" record are to be block read or sensed then forty-eight mechanical sensing elements must be positioned adjacent said record and must be grouped within an area of less than six tenths of one square inch. These sensing elements, although necessarily being very small, must be rigid and structurally stable and must be operatively mounted for movement relative to a supporting frame. Furthermore, each of the sensing elements must be capable of actuating an electrical switching device in order that the desired output signals may be produced. When attempting to construct such a block sensing assembly, it is readily apparent that the prime difficulty encountered is that of space limitations.

One object of the instant invention is to provide a novel perforated record block sensing unit which will occupy a minimum amount of space.

Another object of the instant invention is to provide a block sensing unit having a plurality of rows of minute closely spaced sensing fingers which actuate a plurality of output signal means.

Still another object of the invention is to provide a novel compact construction and arrangement for the sensing, supporting and signal output elements of a block sensing record reader.

A further object of the invention is to provide a block sensing unit having a printed circuit signal output means that is structurally and functionally arranged in combination with a plurality of closely spaced mechanical sensing fingers.

Other objects of the invention will become apparent as the disclosure progresses.

Figure 1:
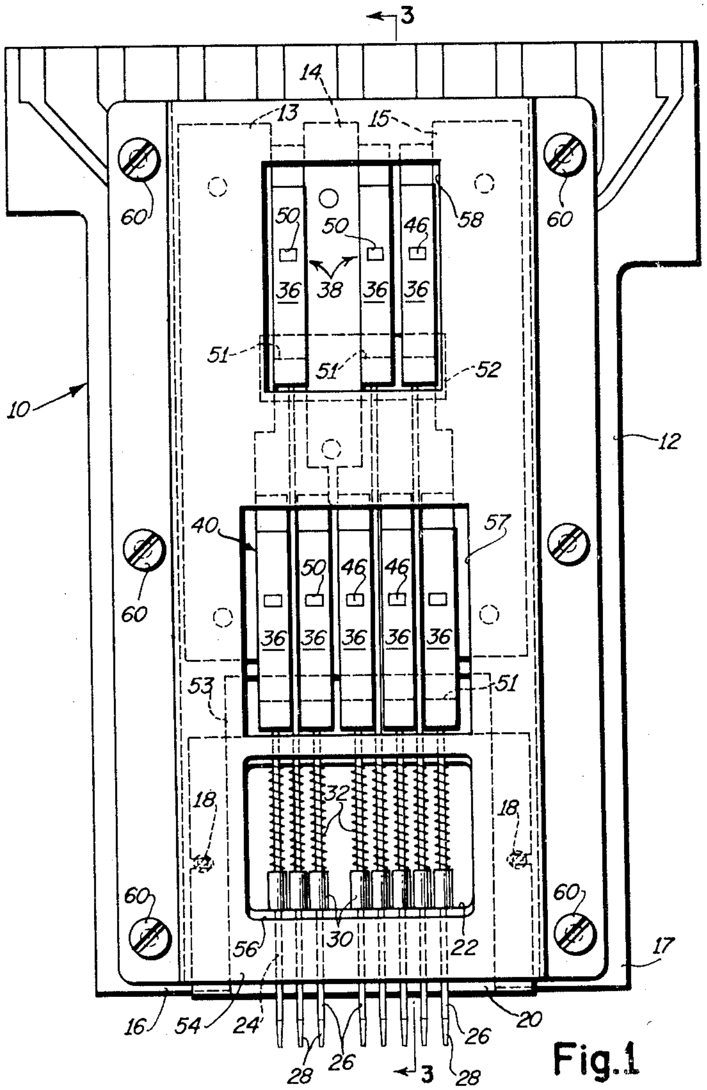
FIG. 1 is a front elevational view of the block sensing assembly.
Figure 2:
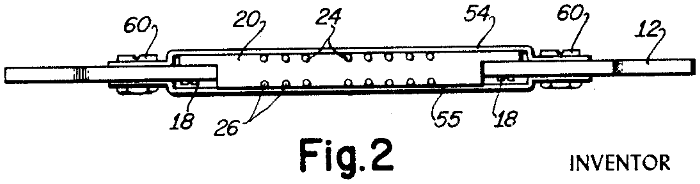
FIG. 2 is an end view of the block sensing assembly.
Figure 3:
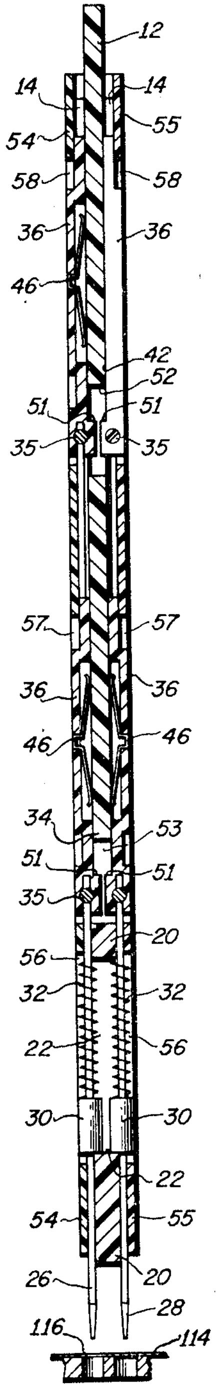
FIG. 3 is a partial sectional view taken along the vertical section line 3—3 of FIG. 1.
Figure 4:
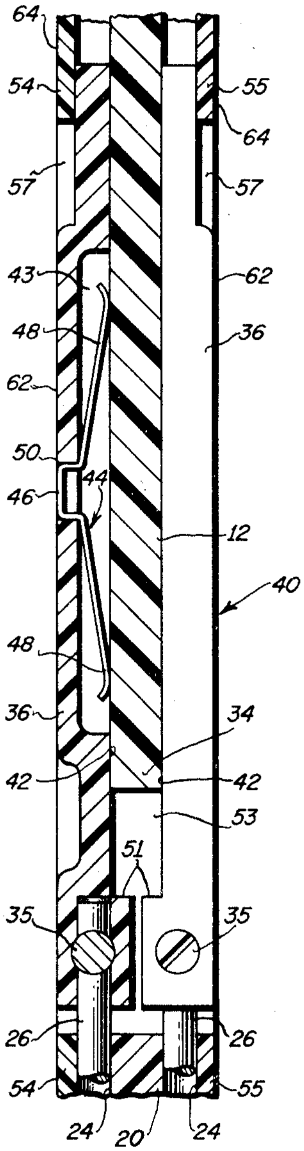
FIG. 4 is a detailed longitudinal sectional view of one of the sensing elements and its associated electrical switching apparatus.
Figure 5:
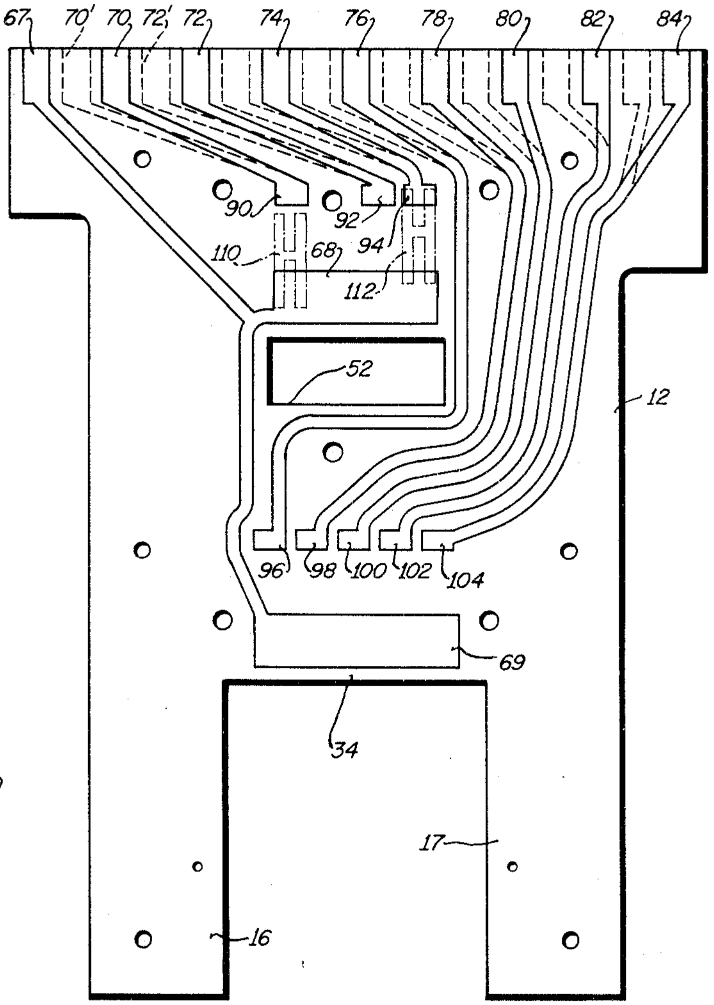
FIG. 5 is a front elevational view of the central frame plate of the instant apparatus and shows the nature of the printed circuits fixed thereon.
Figure 6:
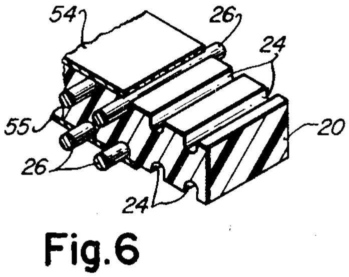
FIG. 6 is a fragmentary perspective view showing the construction of the sensing fingers support arrangement.

Referring to FIGURES 1, 3 and 5 the block sensing assembly 10 comprises a central nonconducting frame plate 12 on either side of which is fixed a plurality of printed circuits. On either side of the upper central portion of plate 12 there is secured three non-conductive spacer guides 13, 14 and 15, FIGURE 1. Fastened to the two depending legs 16 and 17, FIGURES 1 and 5, of plate 12 by means of screws 18 is a finger housing plate 20, FIGURE 1, having a centrally disposed aperture 22 formed therein. Eight vertical U-shaped grooves 24, FIGURES 1, 2 and 6, are formed on each side of plate 20. These grooves each have a width and depth in the order of .075 inch and have a pitch of substantially one tenth of an inch in both the transverse and longitudinal directions. Slidably mounted in each of said grooves 24 is an elongated sensing finger 26 having at its lower end a record engaging tip 28. Each finger 26 has formed thereon an elongated flange 30 which is disposed in said aperture 22 and which provides a stop means for limiting the extent of downward axial movement of the sensing fingers relative to the plates 12 and 20. The sensing fingers 26 are each biased to their respective lower or extended positions by means of individual springs 32 which are operatively disposed between the upper edge of aperture 22 and the respective upper faces of said flanges 30. The sixteen sensing fingers 26 extend upwardly on either side of the midsection 34, FIGURE 5, of said frame plate 12 and are respectively connected by any suitable means, such as screws 35, FIGURE 4, to one of an upper or lower set of nonconductive slide housings 36. The sensing fingers which are connected to the upper set 38, FIGURE 1, of slide housing 36 pass between the mutually adjacent side walls of the lower set 40 of slide housings 36. The slide housings 36 are laterally guided by said spacer guides 13, 14 and 15. Formed on the inner sides of each of said slide housings are bearing surfaces 42, FIGURE 4, which respectively slidably engage either of the opposed faces of the central frame plate 12. In the recess 43, FIGURE 4, of each of said slide housings there is mounted a conductive leaf spring contact member 44 which is adapted to slidably engage the electrically conductive surfaces of said plate 12. Spring contact members 44 each comprise a U-shaped body portion 46, FIGURE 4, and a pair of parallel flexible arms 48 extending angularly from each of the opposed sides of said body portion 46. Each leaf spring contact member 44 is fastened to its associated slide housings 36 by press fitting said body portion 46 into a central aperture 50 formed in the outer wall of each of said housings 36. Each of said slide housings 36 has formed at the lower end thereof an inwardly extending shoulder 51; said shoulders 51 of the upper set 38 of slide housings being disposed in the rectangular aperture 52, FIGURES 3 and 5, formed in the body of plate 12 and the shoulders 51 of the lower set 40 of said slide housings being disposed in the gap 53, FIGURES 3 and 4, between the lower edge of said mid-section 34 of plate 12 and the upper edge of said plate 20.

The record sensing fingers 26 and the slide housings 36 are slidably secured to their respective sides of the frame plate 12 by means of two outer fastening plates 54 and 55, FIGURES 1, 2, 3 and 6, each of which has three apertures 56, 57 and 58, FIGURES 1 and 3, formed therein which respectively register with said aperture 22 and the upper and lower sets 38 and 40 of slide housings 36. Fastening plates 54 and 55 are secured to the plate 12 by any suitable means such as screws 60. In the assembled condition the outer surfaces 62, FIGURE 4, of said slide housings are substantially coplanar with the outer surfaces 64 of the respective fastening plates 54 and 55, and the vertical dimensions of said apertures 56, 57 and 58 are sufficient to allow the fingers 26 and the slide housings 36 to partake of the desired extent of vertical movement.

FIGURE 5 shows the nature of the electrically conductive lines which are "printed" on both faces of the central frame plate 12. The circuitry on each side of the plate 12 is the same except that each of the upper terminals, such as 70 and 72, on the front face of the plate as seen in FIGURE 5, are respectively offset to the right with respect to the corresponding terminals, such as 70', 72', on the rear face of plate 12. In view of the similarity between said circuits a discussion of that for the front side only will suffice here.

The left most terminal 67 is connected to both contact plates 68 and 69. The next three terminals, 70, 72 and 74 are respectively connected to the contacts 90, 92 and 94 which are adapted to be electrically coupled with said plate 68 by means of the respective spring contact members 44 of the upper set 38 of slide housings 36. The last five terminals 76, 78, 80 and 82, 84 are respectively connected to the contacts 96, 98, 100, 102 and 104, which are adapted to be electrically coupled to said contact plate 69 by means of the respective spring contact members 44 of the lower set 40 of slide housings 36. All of said terminals 70, 72, 74, etc., are adapted to be appropriately connected to external wiring in a manner well known in the art.

In the normal condition of the assembly 10, the springs 32, FIGURE 1, maintain the sensing fingers 26 in their respective extended positions wherein the various slide housings 36 retain their respective leaf spring contact members 44 in an inoperative position as illustrated by the phantomed lines 110 of FIGURE 5. When the assembly is lowered to block sense two or more transverse rows of holes in the punched record 114, FIGURE 3, the respective tips 28 of the various sensing fingers will encounter either a punched or unpunched portion of the record. When any sensing finger encounters a hole 116, FIGURE 3, the tip 28 of said finger will pass through the hole and the finger and its associated spring contact member 44 will not be displaced relative to the downwardly moving assembly 10, hence the associated spring contact member 44 will remain in its normal inoperative position as illustrated by said phantomed lines 110 of FIGURE 5. On the other hand if any sensing finger encounters an unpunched portion of the perforated record the downward movement of that finger will be arrested, and a relative movement between the arrested finger and the downwardly moving central plate 12 will be initiated to thereby displace the associated spring contact member 44 to an electrically operative position as illustrated by the phantomed lines 112 of FIGURE 5, thus initiating an output signal at the associated output terminal. It will be seen that the block sensing assembly 10 will produce an output signal only when the respective fingers 26 encounter an unpunched portion of the perforated record. This characteristic of operation has the advantage of insuring that no output signal can be produced when there is no record positioned beneath the sensing fingers 26.

A diminutive block sensing assembly 10 having the above described construction and operation has been made with an overall thickness as little as .188 inch and has been successfully used to block sense two rows of punched holes. Also several of these assemblies have been operatively secured in lateral juxtaposition, the pitch between the successive rows of sensing fingers being equal to one tenth of an inch, thus making possible the block sensing of four, six, eight or more rows of holes punched in the record. In addition to meeting the above noted limited space requirements, it was found that the construction and arrangement of the component parts of these block sensing assemblies were sufficiently simple and stable to be highly reliable and efficient in operation.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. In a perforated record reading device; a block sensing assembly comprising, a thin frame plate having a plurality of electrical conduit lines printed on each side thereof, a plurality of elongated tape sensing fingers slidably mounted on each side of said plate, spring means normally biasing said fingers to their respective extended positions, a lower set of slide housings respectively connected to some of said fingers, the other of said fingers respectively extending between and past said housings, an upper set of slide housings respectively connected to said others of said fingers, and a leaf spring contact member secured to each of said housings and adapted to slidably engage one face of said plate to operatively connect at least two of said lines in response to the respective axial displacements of said fingers.

2. In a perforated record reading unit; a block sensing assembly comprising, a thin frame plate having a plurality of electrical conduit lines printed on each side thereof, a housing plate secured to said frame plate and having a plurality of vertically disposed grooves formed on each side thereof, a small elongated tape sensing finger slidably mounted for axial movement in each of said grooves, spring means associated with said fingers for normally biasing said fingers to their respective extended positions, an upper and a lower set of slide housings respectively connected to the upper ends of said fingers and adapted to slidably engage one face of said frame plate, a leaf spring contact member secured to each of said housings for operatively connecting at least two of said lines in response to the respective axial displacements of said fingers from their said normal extended positions, and a thin fastening plate mounted on each side of said frame plate for maintaining said fingers in said groove and said leaf spring contacts in engagement with the faces of said frame plate.

3. A block sensing assembly comprising; a frame plate having a plurality of electrical conduit lines printed on each side thereof, an apertured housing plate secured to said frame plate and having eight vertically disposed grooves formed on each side thereof, a thin elongated tape sensing finger slidably mounted for axial movement in each of said grooves, spring means associated with each of said fingers for normally biasing said fingers to their respective extended positions, a slide housing connected to the upper end of each of said fingers and adapted to slidably engage one face of said frame plate, a leaf spring contact member secured to the inner side of each of said slide housings for operatively connecting at least two of said lines in response to the respective axial displacement of said fingers from their said normally extended positions, a thin fastening plate secured to each side of said frame plate for retaining said fingers in said grooves and said leaf spring members in engagement with the faces of said frame plate, said fastening plates each having an aperture formed therein which is in registry with said slide housings whereby said housing may be operatively positioned so that their respective outer surfaces are substantially coplanar with the respective outer surfaces of said fastening plates.

4. Apparatus as defined in claim 1 wherein the overall thickness of said assembly is no greater than two tenths of an inch.

5. Apparatus as defined by claim 3 wherein said slide housings are arranged in longitudinally staggered sets.

6. Apparatus as defined in claim 5 wherein the overall thickness of said assembly is substantially equal to two tenths of an inch.

No references cited.